(12) United States Patent
Yamada et al.

(10) Patent No.: US 11,294,395 B2
(45) Date of Patent: Apr. 5, 2022

(54) ACCOMPANYING VEHICLE SELECTION SYSTEM

(71) Applicant: Toyota Jidosha Kabushiki Kaisha, Toyota (JP)

(72) Inventors: Yoshinori Yamada, Nagakute (JP); Masaki Ito, Toyota (JP); Shotaro Inoue, Nissin (JP); Akihiro Muguruma, Nagoya (JP); Michio Ikeda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 287 days.

(21) Appl. No.: 16/530,142

(22) Filed: Aug. 2, 2019

(65) Prior Publication Data

US 2020/0073406 A1 Mar. 5, 2020

(30) Foreign Application Priority Data

Aug. 31, 2018 (JP) .............................. JP2018-164009

(51) Int. Cl.
  *G05D 1/02* (2020.01)
  *B60R 15/04* (2006.01)
  *B60P 3/32* (2006.01)
(52) U.S. Cl.
  CPC ......... *G05D 1/0287* (2013.01); *G05D 1/0276* (2013.01); *B60P 3/32* (2013.01); *B60R 15/04* (2013.01)

(58) Field of Classification Search
  CPC ................. G05D 1/0287; G05D 1/0293–0297
  See application file for complete search history.

(56) References Cited

U.S. PATENT DOCUMENTS

| 10,459,454 | B2 * | 10/2019 | Saxena | G05D 1/0291 |
| 11,002,556 | B2 * | 5/2021 | Smith | G08G 1/22 |
| 2009/0079839 | A1 * | 3/2009 | Fischer | G01S 17/86 348/218.1 |
| 2010/0082179 | A1 * | 4/2010 | Kronenberg | B62D 35/001 701/1 |
| 2010/0256852 | A1 * | 10/2010 | Mudalige | G08G 1/22 701/24 |
| 2011/0000730 | A1 * | 1/2011 | Cazes | B60P 3/122 180/89.1 |
| 2013/0079953 | A1 * | 3/2013 | Kumabe | G08G 1/22 701/2 |
| 2017/0011633 | A1 * | 1/2017 | Boegel | B60W 30/18163 |
| 2017/0068247 | A1 | 3/2017 | Hara | |

(Continued)

FOREIGN PATENT DOCUMENTS

| CN | 101248469 A | 8/2008 |
| CN | 106515728 A | 3/2017 |

(Continued)

*Primary Examiner* — Calvin Cheung
(74) *Attorney, Agent, or Firm* — Dinsmore & Shohl LLP

(57) ABSTRACT

An accompanying vehicle selection system includes: a first vehicle that is provided with a driver's seat; a plurality of second vehicles that have different functions from the first vehicle, and that are configured to travel in accompaniment with the first vehicle; and a control unit that is provided in the first vehicle, and that determines, based on input information, which vehicle from among the plurality of second vehicles is to travel in accompaniment with the first vehicle.

6 Claims, 7 Drawing Sheets

(56) References Cited

U.S. PATENT DOCUMENTS

2017/0199523 A1 7/2017 Barton-Sweeney et al.
2017/0235307 A1 8/2017 Asakura et al.
2018/0211546 A1* 7/2018 Smartt ................. G05D 1/0088

FOREIGN PATENT DOCUMENTS

| CN | 108053641 A | 5/2018 |
| JP | H09-007016 A | 1/1997 |
| JP | 2006-185067 A | 7/2006 |
| JP | 2017-047807 A | 3/2017 |
| JP | 2017-146653 A | 8/2017 |
| JP | 2017-207907 A | 11/2017 |

* cited by examiner

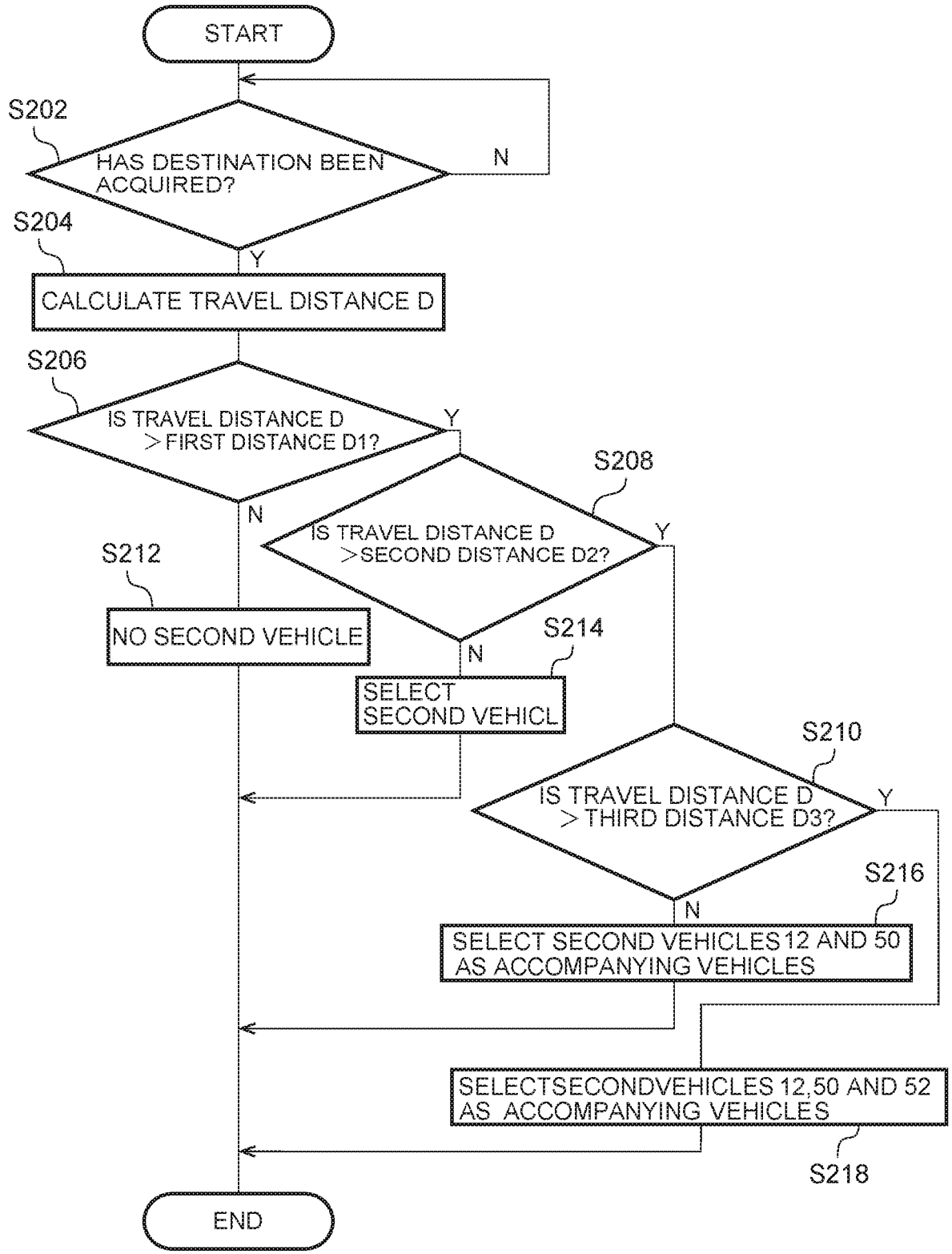

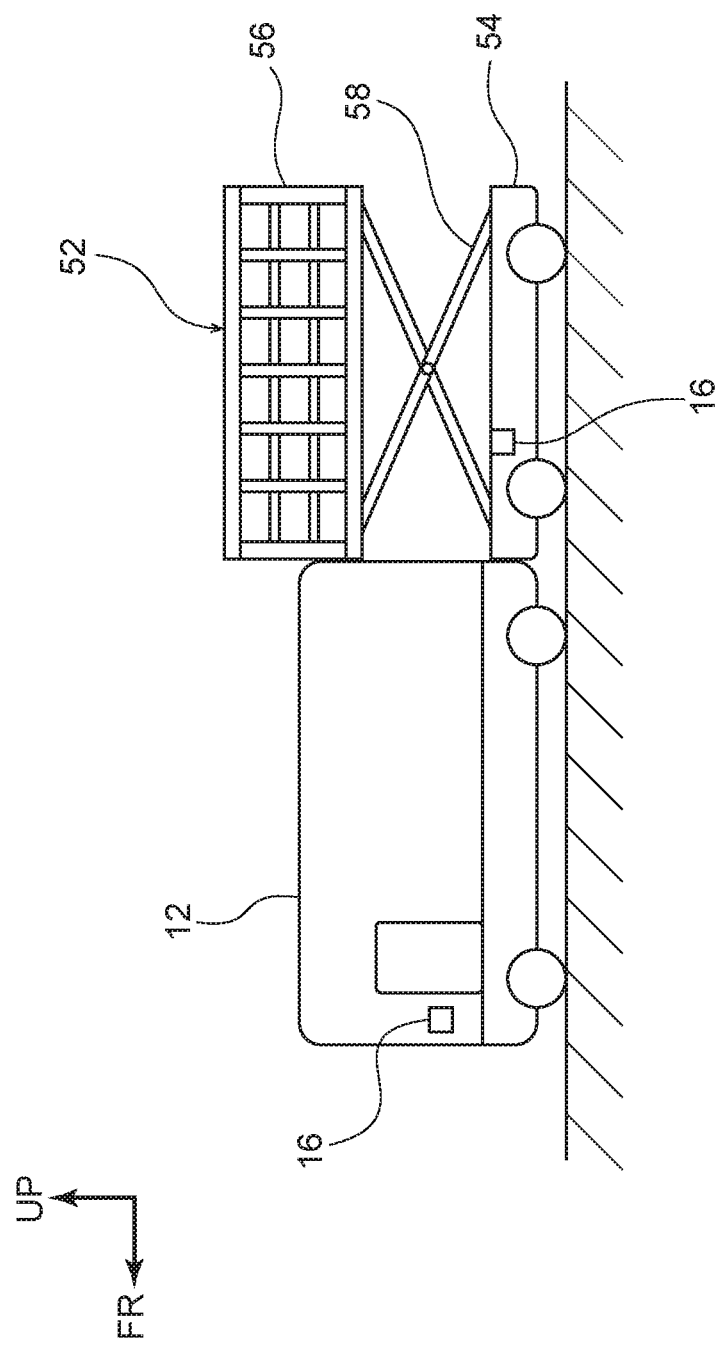

ACCOMPANYING VEHICLE SELECTION SYSTEM

CROSS-REFERENCE TO RELATED APPLICATION

This application is based on and claims priority under 35 USC 119 from Japanese Patent Application No. 2018-164009 filed on Aug. 31, 2018, the disclosure of which is incorporated by reference herein.

BACKGROUND

Technical Field

The present disclosure relates to an accompanying vehicle selection system.

Related Art

A self-driving device in which a towing device that is used to tow a towed vehicle is provided at a rear end portion of a self-driving vehicle is disclosed in Japanese Unexamined Patent Application (JP-A) No. 2017-47807.

However, in the self-driving of a vehicle becoming possible and the way in which a vehicle occupant spends time in a vehicle changing, there is room for improvement from the standpoint of enhancing the comfort of a vehicle occupant who is traveling in a vehicle.

SUMMARY

The present disclosure provides an accompanying vehicle selection system that may improve comfort for a vehicle occupant who is traveling in a vehicle.

A first aspect of the present disclosure is an accompanying vehicle selection system including: a first vehicle that is provided with a driver's seat; a plurality of second vehicles that have different functions from the first vehicle, and that are configured to travel in accompaniment with the first vehicle; and a control unit that is provided in the first vehicle, and that determines, based on input information, which vehicle from among the plurality of second vehicles is to travel in accompaniment with the first vehicle.

The accompanying vehicle selection system of the first aspect, a plurality of second vehicles have different functions from a first vehicle that is provided with a driver's seat. Additionally, the second vehicles travel in accompaniment with the first vehicle. The accompanying vehicle selection system is also provided with a control unit, and this control unit determines which vehicle from among the plurality of second vehicles is to travel in accompaniment with the first vehicle based on input information. In this way, by causing a second vehicles having mutually different functions to travel in accompaniment with a first vehicle, it may improve comfort for a vehicle occupant who is traveling by vehicle. Note that the term 'travel in accompaniment' is not limited to structures in which the first vehicle and the second vehicle are traveling in accompaniment with each other while being physically linked to each other, and also includes structures in which the second vehicle is physically separated from the first vehicle and is accompanying the first vehicle by means of communication between the vehicles (i.e. vehicle-to-vehicle communication).

In a second aspect of the present disclosure, in the first aspect, the control unit may determine a second vehicle input by an occupant of the first vehicle as being an accompanying vehicle.

The accompanying vehicle selection system of the second aspect, a vehicle occupant inputs the second vehicle that the vehicle occupant wishes to be the accompanying vehicle, and this input second vehicle is made to accompany the first vehicle.

In a third aspect of the present disclosure, in the first aspect, the control unit may determine, based on an input destination, which of the plurality of second vehicles is to accompany the first vehicle.

The accompanying vehicle selection system of the third aspect, the second vehicle that is to accompany the first vehicle is determined based on a destination without a vehicle occupant directly inputting the second vehicle that is to accompany the first vehicle.

In a fourth aspect of the present disclosure, in the third aspect, the control unit may proportionally increase a number of second vehicles that are to accompany the first vehicle, as a distance to the input destination increases.

The accompanying vehicle selection system of the fourth aspect, the number of functions required for a comfortable journey increases proportionally as the distance to the input destination increases. Because of this, by increasing the number of second vehicles that are to accompany the first vehicle, comfort is ensured even if the distance to the destination is considerable.

In a fifth aspect of the present disclosure, in any one of the first through fourth aspects, a vehicle including a vehicle cabin interior that functions as a living room is included among the plurality of second vehicles.

The accompanying vehicle selection system of the fifth aspect, a user may spend time in a living room both during travel and after having reached a destination.

In a sixth aspect of the present disclosure, in any one of the first through fifth aspects, a vehicle including a vehicle cabin interior that functions as a toilet and bathroom is included among the plurality of second vehicles.

The accompanying vehicle selection system of the sixth aspect, a user may freely use a toilet and bathroom both during travel and after having reached a destination.

The accompanying vehicle selection system of the present disclosure, the comfort of a vehicle occupant when traveling in a vehicle may be improved.

BRIEF DESCRIPTION OF THE DRAWINGS

An exemplary embodiment of the present disclosure will be described in detail based on the following figures, wherein:

FIG. 6 is a flowchart showing another example of a flow of vehicle determination processing performed by a vehicle determination unit; and FIG. 7 is a schematic structural view showing another example of a second vehicle.

DETAILED DESCRIPTION

Figure 1:
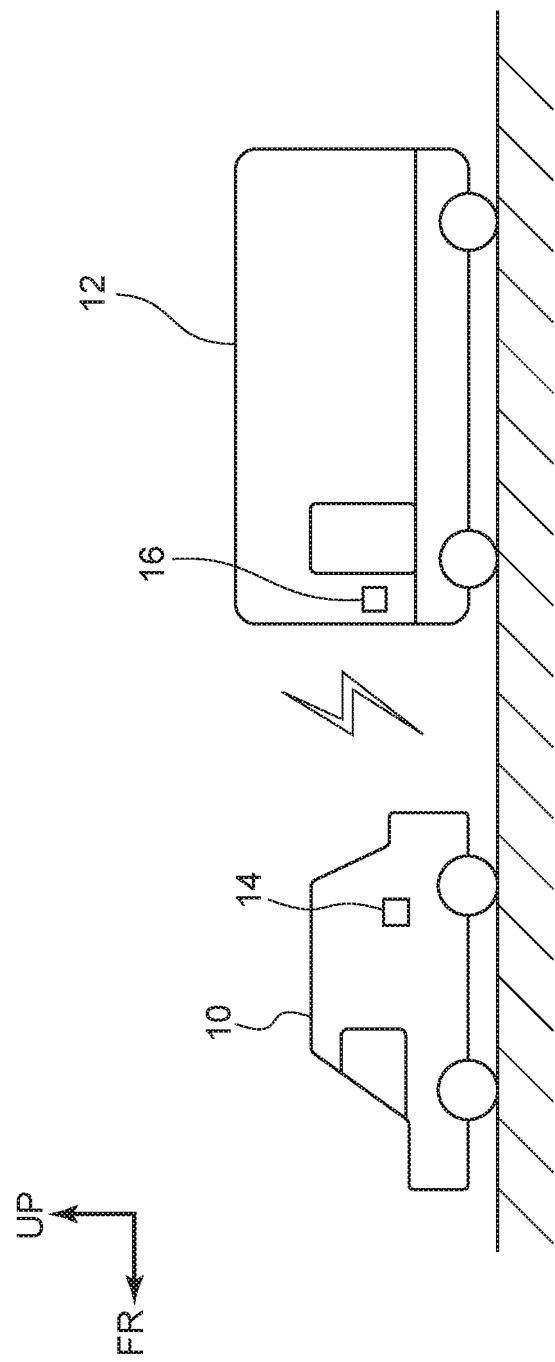
FIG. 1 is a view showing a schematic structure of an accompanying vehicle selection system according to an exemplary embodiment, and shows a state in which a single second vehicle is accompanying a first vehicle.

An accompanying vehicle selection system according to an exemplary embodiment will now be described with reference to the drawings. As is shown in FIG. 1, this accompanying vehicle selection system is formed so as to include a first vehicle 10, a second vehicle 12, and a vehicle control device 14, which is serving as a control unit.

The first vehicle 10 is provided with a driver's seat, and is formed such that the first vehicle 10 can be driven by a vehicle occupant. In addition, the first vehicle 10 is able to be switched via an operation performed by a vehicle occupant between a manual driving mode in which a vehicle occupant drives the vehicle themselves, and a self-driving mode in which the first vehicle 10 performs self-driving.

Here, the vehicle control device 14 is provided in the first vehicle 10. The vehicle control device 14 will be described below.

The second vehicle 12 is provided with different functions from those of the first vehicle 10. The second vehicle 12 shown in FIG. 1 is a vehicle whose vehicle cabin interior functions as a living room. In other words, furniture such as a sofa and table and the like, and home electrical and mechanical equipment such as a television and audio equipment and the like (i.e., home appliances) can be housed inside the vehicle cabin of the second vehicle 12.

In addition, a transmitter/receiver unit 16 is also provided in the second vehicle 12, and the second vehicle 12 is formed such that signals transmitted from the first vehicle 10 can be received by this transmitter/receiver unit 16. Note that a driver's seat is not provided in the second vehicle 12, and the second vehicle 12 is formed such that it is able to travel while following the first vehicle 10 by receiving signals from the first vehicle 10.

Figure 3:
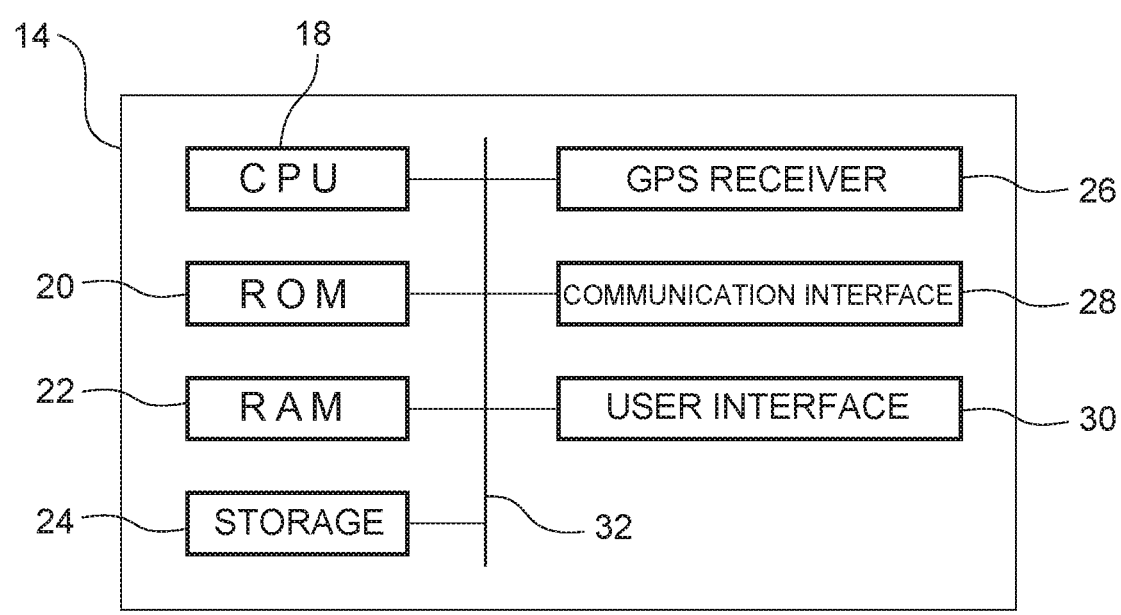
FIG. 3 is a block diagram showing a hardware structure of a vehicle control device.

As is shown in FIG. 3, the vehicle control device 14 is formed so as to include a CPU (Central Processing Unit) 18, ROM (Read Only Memory) 20, RAM (Random Access Memory) 22, storage 24, a GPS receiver 26, a communication interface 28, and a user interface 30. These respective structures are connected together so as to be able to communicate with each other via a bus 32.

The CPU 18 is a central operation processing unit and performs operations such as executing various programs and controlling various units. In other words, the CPU 18 reads a program from the ROM 20 or the storage 24, and executes that program using the RAM 22 as a work area. The CPU 18 controls the above-described respective structures and performs the various types of processing in accordance with the program recorded in the ROM 20 or the storage 24. In the present exemplary embodiment, a program that is used to determine the accompanying second vehicle 12, and a program that enables the second vehicle 12 to travel by following the first vehicle, and the like are stored in the ROM 20 or the storage 24.

The ROM 20 stores various types of programs and various types of data. The RAM 22 holds programs and data temporarily as a work area. The storage 24 is formed by an HDD (Hard Disk Drive) or an SSD (Solid State Drive), and stores various types of programs, including an operating system, as well as various types of data.

The GPS receiver 26 receives signals based on a GPS system from plural satellites, and identifies the position of the first vehicle 10 from arrival time differences between the signals.

The user interface 30 is an interface that is used when a user on board the first vehicle 10 uses the vehicle control device 14. The user interface 30 includes, for example, at least one of a liquid crystal display that is provided with a touch panel which enables a touch operation to be performed by a user, a voice input receiving unit that receives voice input from a user, or buttons capable of being pressed by a user. The communication interface 28 is an interface that is used by the vehicle control device 14 to communicate with the second vehicle 12 and with other devices, and a Standard such as, for example, Ethernet (registered trademark), FDDI, Wi-Fi (registered trademark), or the like is used for this interface.

The vehicle control device 14 implements various functions using the above-described hardware resources. The functional structures implemented by the vehicle control device 14 are described below with reference to FIG. 4.

Figure 4:
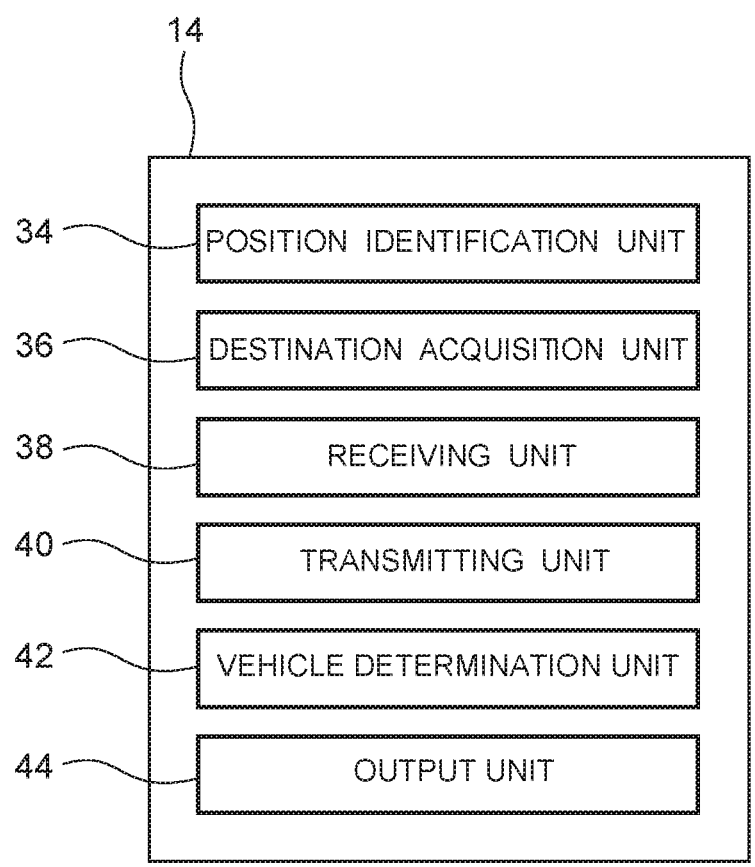
FIG. 4 is a block diagram showing an example of function structures of a vehicle control device.

As is shown in FIG. 4, as functional structures, the vehicle control device 14 has a position identification unit 34, a destination acquisition unit 36, a receiving unit 38, a transmitting unit 40, a vehicle determination unit 42, and an output unit 44. Each functional structure is implemented as a result of the CPU 18 reading a program stored in the ROM 20 or storage 24 and then executing this program.

Figure 2:
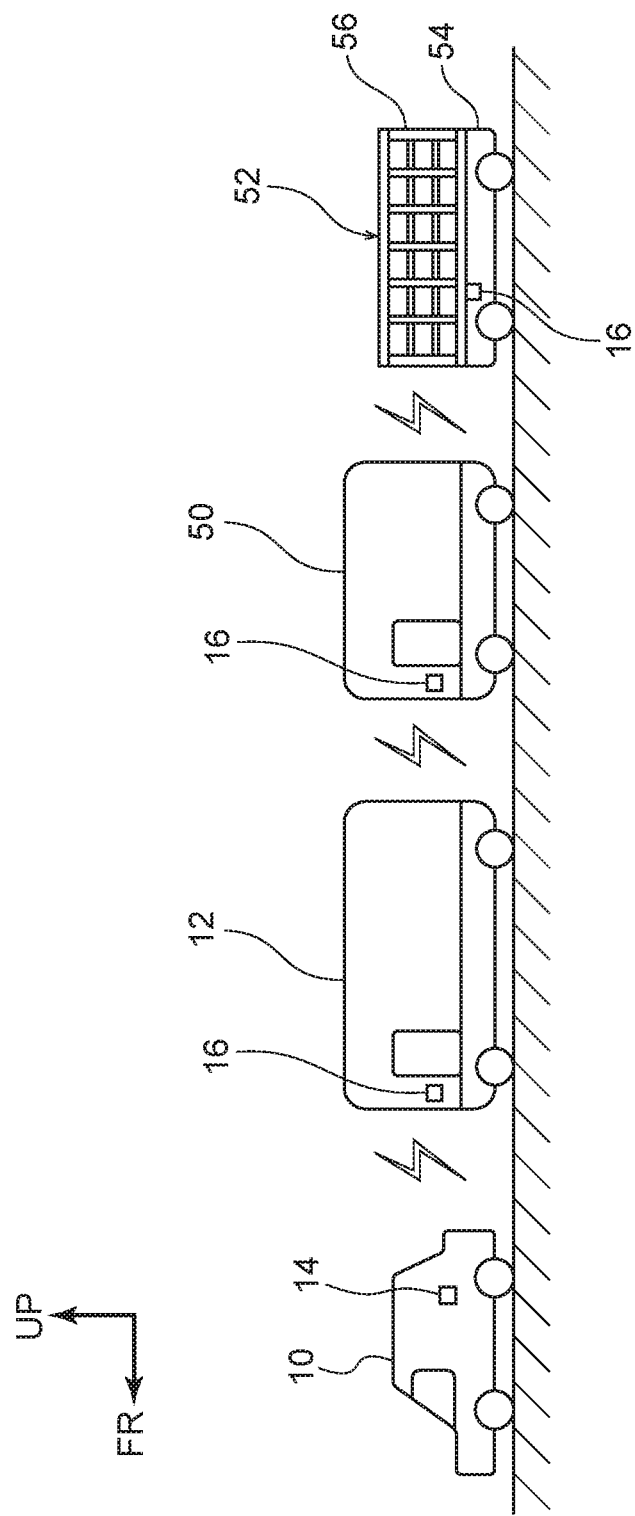
FIG. 2 is a view showing the schematic structure of the accompanying vehicle selection system according to the exemplary embodiment, and shows a state in which three second vehicles are accompanying the first vehicle.

The position identification unit 34 identifies the position of the second vehicle 12. Note that, as is shown in FIG. 2, when plural second vehicles 12, 50, and 52 are traveling in accompaniment with the first vehicle 10, the positions of all of the second vehicles 12, 50, and 52 are identified.

In FIG. 4, the destination acquisition unit 36 acquires destinations input via the user interface 30.

The receiving unit 38 receives a signal transmitted from the second vehicle 12. The signal transmitted from the second vehicle 12 includes, for example, position information for the second vehicle 12, and status information such as the remaining fuel quantity and the like in the second vehicle 12.

The transmitting unit 40 transmits position information and the like for the first vehicle 10 to the second vehicle 12. The destination, travel route, and the like may also be transmitted.

The vehicle determination unit 42 determines which vehicle out of plural second vehicles is to accompany the first vehicle 10 based on input information.

At this point, the second vehicle 50 and the second vehicle 52 will be described with reference to FIG. 2. The second vehicle 50 is provided with different functions from those of the first vehicle 10, and is formed so as to be able to travel in accompaniment with the first vehicle 10. In addition, the second vehicle 50 is constructed as a vehicle whose vehicle cabin interior functions as a toilet and bathroom. In other words, a toilet fixture and a bathtub and the like are installed inside the vehicle cabin of the second vehicle 50.

The same type of transmitter/receiver unit 16 as that provided in the second vehicle 12 is also provided in the second vehicle 50, so that the second vehicle 50 is also able to receive signals transmitted from the first vehicle 10 via the transmitter/receiver unit 16.

The second vehicle 52 is also provided with different functions from those of the first vehicle 10, and is formed so as to be able to travel in accompaniment with the first vehicle 10. In addition, the second vehicle 52 has a structure in which a wooden deck 56 is provided above a base portion 54. Furthermore, the same type of transmitter/receiver unit 16 as that provided in the second vehicle 12 is also provided in the second vehicle 52. Note that, in FIG. 2, no roof is provided on the second vehicle 52, however, it is also possible for a roof to be provided thereon. As is described above, this accompanying vehicle selection system is formed so as to include plural second vehicles 12 that are each provided with different functions from those of the first vehicle 10.

Next, a vehicle determination processing routine performed by the vehicle determination unit 42 will be described with reference to the flowchart in FIG. 5. This vehicle determination processing is performed as a result of the CPU 18 reading a vehicle determination program from the ROM 20 or the storage 24, and then expanding the vehicle determination program in the RAM 22 and executing the processing thereof.

Figure 5:
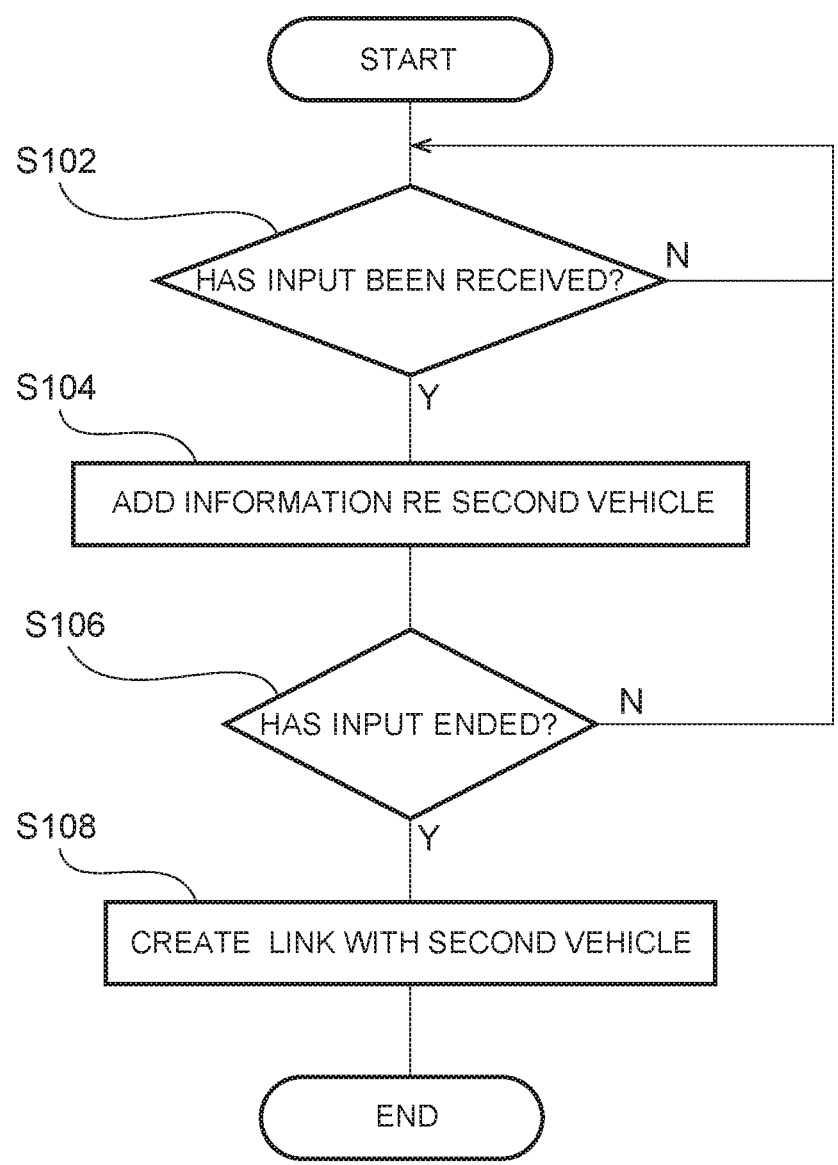
FIG. 5 is a flowchart showing an example of a flow of vehicle determination processing performed by a vehicle determination unit.

As is shown in FIG. 5, in step S102, the CPU 18 determines whether or not an input has been received. More specifically, the CPU 18 determines whether or not an input has been made by an occupant of the first vehicle 10 into the vehicle control device 14 via the user interface 30. The input referred to here is not limited to input via a touch panel or via buttons being pressed, and may also be made via voice input or the like.

When an input has been made by a vehicle occupant, the routine moves to step S104. If no input has been made by a vehicle occupant, the CPU 18 determines once again whether or not an input has been received, and repeats the processing of step S102 until an input is received.

In step S104, the CPU 18 adds information about the input vehicle. More specifically, the CPU 18 identifies the second vehicle that corresponds to the information input by the vehicle occupant, and registers in the RAM 22 that this particular second vehicle is the vehicle that is to accompany the first vehicle 10. The routine then moves to step S106.

In step S106, the CPU 18 determines whether or not an input has ended. For example, the CPU 18 may determine that an input has ended as a result of a vehicle occupant performing an input end operation via the user interface 30. Additionally, it is also possible to employ a structure in which the CPU 18 determines that the selection of the second vehicle that is to accompany the first vehicle 10 has ended when a vehicle occupant performs an operation to start self-driving.

When it is determined in step S106 that an input has ended, the routine moves to step S108. If it is determined that an input has not ended, the routine returns to step S102.

In step S108, the CPU 18 creates a link with the input second vehicle. More specifically, the CPU 18 transmits a signal to each second vehicle that has been selected via the communication interface 28 from the first vehicle 10. The second vehicles that receive this signal from the first vehicle 10 make preparations to accompany the first vehicle 10. Once these preparations to accompany the first vehicle 10 have been completed, the second vehicles transmit a signal notifying that preparations have been completed to the first vehicle 10.

(Operation)

Operation of the present exemplary embodiment are described next.

In the accompanying vehicle selection system of the present exemplary embodiment, the vehicle control device 14 determines which vehicle out of plural second vehicles 12, 50, and 52 is to accompany the first vehicle 10 based on information input by a vehicle occupant. By causing the second vehicles 12, 50, and 52, which each have mutually different functions, to accompany the first vehicle 10 in this way, it is possible to improve comfort when traveling via a vehicle.

Moreover, in the present exemplary embodiment, a vehicle occupant is able to input which second vehicles they desire to accompany them, and then cause the input second vehicles to travel in accompaniment with them. Because of this, when a vehicle occupant needs to go somewhere, they are able to be take with them only those second vehicles that they judge will be needed, and leave behind the second vehicles that they will not need. In other words, as is shown in FIG. 1, if a vehicle occupant desires that only the second vehicle 12 travel in accompaniment with them, then they are able to travel while leaving the other second vehicles behind.

Furthermore, in the present exemplary embodiment, it is also possible to include a vehicle that functions as a living room, as in the case of the second vehicle 12, so that both en-route and after having reached a destination, a vehicle occupant is able to pass the time in a living room as if they were in their own home.

Furthermore, in the present exemplary embodiment, as is shown in FIG. 2, because the second vehicle 50 that functions as a toilet and bathroom is included, a vehicle occupant is able to freely use a toilet and bathroom both en-route and after having reached their destination.

Note that, in the present exemplary embodiment, a method in which the vehicle determination processing performed by the vehicle determination unit 42 is implemented by a vehicle occupant directly selecting the accompanying second vehicle is described, however, the present disclosure is not limited to this, and the vehicle determination processing may also be performed via another method. For example, the second vehicle that is to accompany the first vehicle 10 may also be determined via a method such as that shown in the flowchart in FIG. 6.

In the vehicle determination processing shown in FIG. 6, the CPU 18 determines in step S202 whether or not a destination has been acquired. Here, this determination is made by determining whether or not a destination has been input into the vehicle control device 14 by an occupant of the first vehicle 10 via the user interface 30. The input referred to here is not limited to input via a touch panel or via buttons being pressed, and may also be made via voice input or the like.

If a destination has been input, the routine moves to step S204. If a destination has not been acquired (i.e., if no input has been made), then once again whether or not a destination has been acquired is determined. The processing of step S202 is repeated until a destination is acquired.

In step S204, the CPU 18 calculates a travel distance to the destination. For example, the CPU 18 identifies the current position of the first vehicle 10 based on a signal from the GPS receiver 26. Next, the CPU 18 creates a travel route to the destination from the current position of the first vehicle 10 using map data, and then calculate a travel distance D of this travel route.

In step S206, the CPU 18 compares the travel distance D with a previously set first distance D1, and then determines whether or not the travel distance D is longer than the first distance D1. If the travel distance D is longer than the first distance D1, the routine moves to step S208. If, however, the travel distance D is shorter than the first distance D1, the routine moves to step S212.

In step S208, the CPU 18 compares the travel distance D with a previously set second distance D2, and then determines whether or not the travel distance D is longer than the second distance D2. If the travel distance D is longer than the second distance D2, the routine moves to step S210. If, however, the travel distance D is shorter than the second distance D2, the routine moves to step S214. Note that the second distance D2 is set as a longer distance than the first distance D1.

In step S210, the CPU 18 compares the travel distance D with a previously set third distance D3, and then determines whether or not the travel distance D is longer than the third distance D3. If the travel distance D is longer than the third distance D3, the routine moves to step S218. If, however, the travel distance D is shorter than the third distance D3, the routine moves to step S216. Note that the third distance D3 is set as a longer distance than the second distance D2.

Step S212 is performed when it is determined in step S206 that the travel distance D is shorter than the first distance D1, meaning that the destination is close by. In this case, the CPU 18 does not set an accompanying vehicle and determines that only the first vehicle 10 will travel.

Step S214 is performed when it is determined in step S208 that the travel distance D is longer than the first distance D1 but shorter than the second distance D2. In this case, the CPU 18 sets the second vehicle 12 as the vehicle that will travel in accompaniment with the first vehicle 10.

Step S216 is performed when it is determined in step S210 that the travel distance D is longer than the second distance D2 but shorter than the third distance D3. In this case, the CPU 18 sets the second vehicle 12 and the second vehicle 50 as the vehicles that will travel in accompaniment with the first vehicle 10.

Step S218 is performed when it is determined in step S210 that the travel distance D is longer than the third distance D3. In this case, the CPU 18 sets the second vehicle 12, the second vehicle 50, and the second vehicle 52 as the vehicles that will travel in accompaniment with the first vehicle 10.

As is described above, in the above-described vehicle determination processing, the longer the travel distance D to the destination, the greater the number of second vehicles accompanying the first vehicle 10. By determining which second vehicles will travel in accompaniment with the first vehicle 10 based on the destination that has been input in this way, a vehicle occupant does not have to directly input the second vehicles that are to accompany the first vehicle 10. Additionally, because a greater number of functions are needed to make the travel comfortable as the distance to the destination increases, by increasing the number of second vehicles to travel in accompaniment with the first vehicle, it is possible to guarantee the comfort of a vehicle occupant even when the distance to the destination is substantial.

An exemplary embodiment of the present disclosure has been described above, however, the present disclosure is not limited to this. Various modifications and the like may be made to the present disclosure insofar as they do not depart from the spirit or scope of the present disclosure. For example, as is shown in FIG. 1 and FIG. 2, in the above-described embodiment a structure is employed in which the second vehicle 12 is made to follow the first vehicle 10 using vehicle-to-vehicle communication, however, the present disclosure is not limited to this. In other words, it is also possible for the second vehicle 12 to be physically linked to the first vehicle 10. Additionally, it is also possible to employ a structure in which, while traveling, the first vehicle 10 and the second vehicle 12 are separated from each other, and only once they have reached the destination and have stopped are the first vehicle 10 and the second vehicle 12 physically linked together. In this case, by linking the second vehicle 12 to a side portion of the first vehicle 10 so that the vehicle cabin interiors of each are in mutual communication, a vehicle occupant is able to move from the driver's seat to the living room. Moreover, as is shown in FIG. 7, the second vehicle 52 may also be linked to the second vehicle 12.

As is shown in FIG. 7, the second vehicle 12 and the second vehicle 52 are both in a stopped state, and the second vehicle 52 is physically linked to a rear portion of the second vehicle 12. Here, a structure is employed in which a lifter 58 is provided on a base portion of the second vehicle 52, and the wooden deck 56 is able to be moved up and down by this lifter 58.

By operating the lifter 58 so that the wooden deck 56 is raised to the height of the ceiling portion of the second vehicle 12, it becomes possible to access the wooden deck 56 from the ceiling portion of the second vehicle 12. As a consequence of this, a living space having both a living room as well as the wooden deck 56 with an excellent view is created, so that the comfort of the vehicle occupant is further improved.

Additionally, in the above-described embodiment, the second vehicle 12 that is provided with the functions of a living room, the second vehicle 50 that is provided with the functions of a toilet and bathroom, and the second vehicle 52 that is provided with the functions of a wooden deck are illustrated and described, however, second vehicles provided with other functions may also be included. For example, it is also possible to include a second vehicle whose vehicle cabin interior is provided with training equipment and that is provided with the functions of a training room. Alternatively, a second vehicle provided with the functions of a stage may be included, and even a second vehicle whose vehicle cabin interior is provided with cooking equipment, and that is provided with the functions of a kitchen may also be included.

What is claimed is:

1. An accompanying vehicle selection system comprising:
   a first vehicle that is provided with a driver's seat;
   a plurality of second vehicles that have different functions from the first vehicle, and that are configured to travel in accompaniment with the first vehicle; and
   a control unit that is provided in the first vehicle, and that determines, based on an input destination, which vehicle from among the plurality of second vehicles is to travel in accompaniment with the first vehicle,
   wherein the control unit proportionally increases a number of second vehicles that are to accompany the first vehicle, as a distance to the input destination increases.

2. The accompanying vehicle selection system according to claim 1, wherein the control unit determines a second vehicle input by an occupant of the first vehicle as being an accompanying vehicle.

3. The accompanying vehicle selection system according to claim 1, wherein a vehicle including a vehicle cabin interior that functions as a living room is included among the plurality of second vehicles.

4. The accompanying vehicle selection system according to claim 1, wherein a vehicle including a vehicle cabin interior that functions as a toilet and bathroom is included among the plurality of second vehicles.

5. The accompanying vehicle selection system according to claim 1, wherein the control unit controls each of the plurality of second vehicles to follow the first vehicle, using vehicle-to-vehicle communication.

6. The accompanying vehicle selection system according to claim 1, wherein the first vehicle and each of the plurality of second vehicles is configured so as to be able to be physically linked to each other in a case in which the first vehicle and the second vehicles are in a stopped state.

* * * * *